United States Patent

[11] 3,590,619

| [72] | Inventors | Walter Sheldon;<br>Gary Eigenbrode, both of Waynesboro, Pa. |
|---|---|---|
| [21] | Appl. No. | 746,025 |
| [22] | Filed | July 19, 1968 |
| [45] | Patented | July 6, 1971 |
| [73] | Assignee | Landis Machine Company<br>Waynesboro, Pa. |

[54] MANUFACTURE OF HERRINGBONE GEARS
2 Claims, 3 Drawing Figs.

[52] U.S. Cl................................................. 72/102,
29/159.2
[51] Int. Cl...................................................... B21h 5/02
[50] Field of Search........................................... 72/102,
107, 108, 365, 366, 478; 29/125, 159.2

[56] References Cited
UNITED STATES PATENTS

| 132,899 | 11/1872 | Comly........................... | 72/69 |
|---|---|---|---|
| 1,568,648 | 1/1926 | White........................... | 72/102 |
| 3,261,192 | 7/1966 | Tadashi Saito et al......... | 72/106 |

FOREIGN PATENTS

| 149,938 | 7/1921 | Great Britain................ | 29/159.2 |

*Primary Examiner*—Lowell A. Larson
*Attorney*—Strauch, Nolan, Neale, Nies and Kurz ABSTRACT: Dies for roll forming herringbone gears from a unitary workpiece. The dies are of two part construction, each part having peripheral ridge and groove formations complementary to the teeth to be formed on the workpiece, the formations being of opposite hand and joining at the central plane of the die.

PATENTED JUL-6 1971

3,590,619

INVENTORS
WALTER SHELDON
GARY EIGENBRODE

BY
Strauch Nolan Neale Nies + Kurz
ATTORNEYS

MANUFACTURE OF HERRINGBONE GEARS

BACKGROUND OF INVENTION

The advantages of herringbone gears, i.e., gears having external teeth formed in oppositely directed helics, have long been known. One primary advantage is the internal absorption of thrust. It is principally because of this characteristic that herringbone gears are commonly used for the transmission of very heavy loads, for example, in marine propulsion systems and stationary power plants which require the transmission of several thousand horsepower from one shaft to another. In such installations, the gears are of very large size and may be as much as 6 feet in diameter. Because of their size, they may be manufactured with various types of machining operations. Further, such large herringbone gears may incorporate a space between the adjacent edges of the oppositely directed teeth and thus permit the formation of the teeth with machine tools which must extend beyond the ends of the teeth during the tooth formation.

The capability of thrust absorption also makes herringbone gears attractive in other applications. It has for some time, for example, been recognized that automotive transmissions could be considerably reduced in size if the requirement for thrust bearings and associated support structure could be eliminated. At present this can be done only by utilizing spur pinion gears or herringbone gears. The former are unacceptable because of their high noise level. Herringbone gears, on the other hand, are prohibitively expensive for such applications.

Prior to the present invention it has been possible to manufacture such gears only be a broaching method in accordance with the so-called Sikes method, which is slow and very costly. The methods for manufacturing herringbone gears of small size, for example, those of 6 inch diameter or less, are severely restricted since a space between the adjacent ends of the oppositely directed teeth cannot be tolerated in such gears because of space limitations.

Thus, despite their significant advantages, the use of herringbone gears has continued to be confined to very large gears where the cost of production of the gear teeth is of less significance.

SUMMARY OF THE INVENTION

In accordance with the present invention, herringbone gears of relatively small size suitable for use, for example, in automotive transmissions, are produced by rolling them from a cylindrical workpiece with novel rolling dies and techniques. Preferably the workpiece is positioned between a pair of essentially cylindrical rotating dies each having peripheral formations, complementary to the teeth to be formed on the workpiece and one of the dies is moved toward the other to impress the desired tooth formation on the periphery of the workpiece. A suitable machine for performing the rolling operation is disclosed in U.S. Pat. application Ser. No. 618,750 filed Feb. 27, 1967 and owned by applicant's assignee.

The rolling dies of the present invention are of unique two-part construction. The individual parts have peripheral helical formations which are so formed that when the die parts are assembled, the periphery of the resulting die assembly is of herringbone configuration with the helical formations of one part joining the helical formations of the other part at the central plane of the die assembly. Thus, the peripheral formations in the die assembly, which form the workpiece are continuous from side to side, and form similar continuous herringbone teeth on the workpiece during the rolling operation. The die assembly may be produced at a cost which is comparable with prior dies used for the formation of helical or spur gears.

Such dies are effective to roll form herringbone gears at production rates which may be a hundred or more times as great as the only available present method of forming such gears. At the same time the finished gears have significantly improved strength and wear properties.

With the foregoing considerations in mind it is a principal purpose and object of the present invention to provide novel die and method for the fabrication of such dies which permit the production of herringbone gears at a small fraction of the cost of prior processes and at substantially increased production rates while affecting significant product improvement.

Further objects and advantages will become apparent as the description proceeds in connection with the accompanying drawings.

DESCRIPTION OF PREFERRED EMBODIMENT

Figure 1:
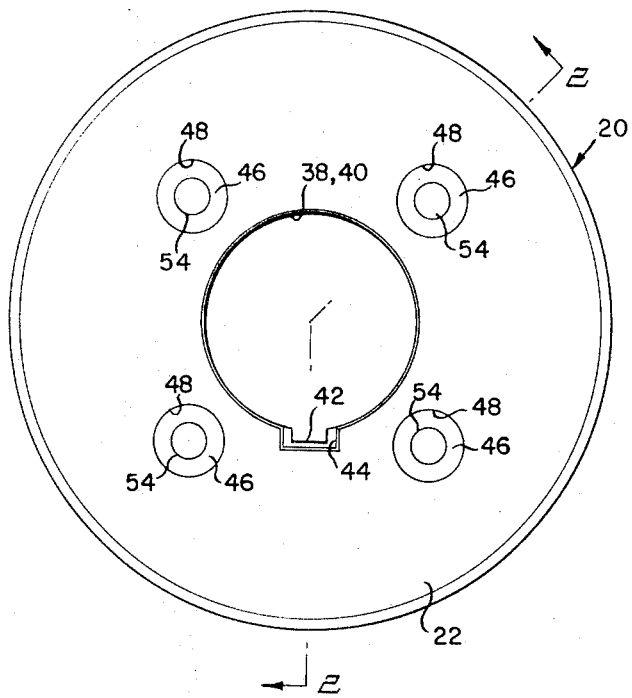
FIG. 1 is a side-elevation of the die of the present invention.
Figure 2:
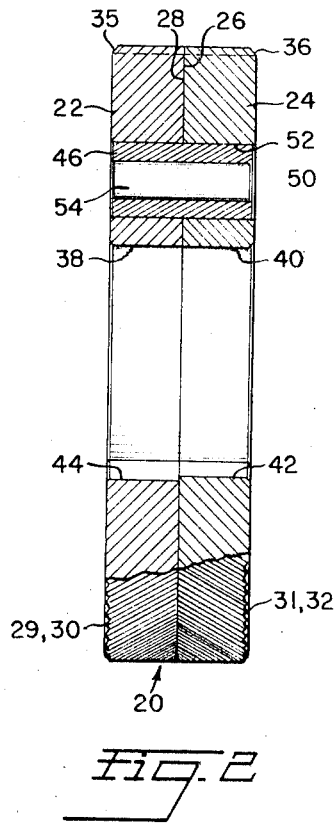
FIG. 2 is a transverse section taken along line 2-2 of FIG. 1.
Figure 3:
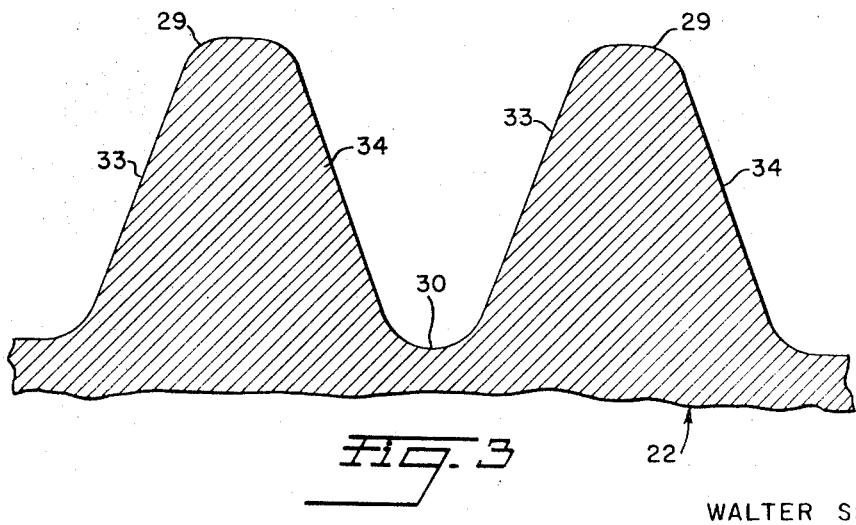
FIG. 3 is an enlarged fragmentary view showing a portion of the ridges and grooves in rack form from which the ridges and grooves provided on the periphery of the die are derived.

Referring now more particularly to the drawings, the die assembly 20 comprises two die parts 22 and 24 secured together with their adjacent faces 26 and 28 respectively in full surface contact. The die part 22 is provided with peripheral ridge and groove formations 29, 30 of helical configuration which are complementary to the desired teeth to be formed on the workpiece. The die part 24 has corresponding ridge and groove formations 31, 32 which are identical to the formations 29, 30 except that they are of the opposite hand. These formations, which are preferably formed by first hobbing them to rough form and then finish grinding are shown in greatly enlarged scale in FIG. 3. In FIG. 3 the formations are shown in accordance with conventional practice, that is, as they appear in rack form and normal to the pitch diameter helix. In each form the involute flanks 33, 34 of the ridges appear as straight lines. The actual involute on the dies is applicable to the production of a 25 tooth 23 dp. gear suitable for use in an automotive transmission. The die part 22 has the following principal dimensions:

Major Diameter—8.512283
Pitch Diameter—8.403883
Minor Diameter—8.296883
Addendum—.0542
Dedendum—.0535
Helix Angle—29° 36′ 59″ L.H.
Pressure Angle (NOR)—20° 49′ 35″
Diametral Pitch (NOR)—23.268707
No. of Teeth—170
Lead—46.444401

It is to be understood that these dimensions are given by way of example and will be varied depending upon the nature of the workpiece to be formed. The dimensions given are applicable to the die part 22 or the die part 24 except that one part will have a left-hand helix angle and the other part will have a right-hand helix angle.

It will be noted that at their outer faces, the parts 22 and 24 are chamfered as at 35 and 36 to facilitate the subsequent rolling operation and to provide relief to reduce the possibility of tooth breakage.

The die parts are provided with central bores 38 and 40 to accommodate the operating shaft of the roll forming apparatus with which they are used. In accordance with conventional practice the dies are keyed to their associated shafts. In the dies of the present invention, however, the operative portion of the keyway, indicated at 42, is formed only in the die part 24. The part 22 has an enlarged cutout 44 which accommodates the key provided on the roll shaft with substantial clearance at each side.

It is of critical importance that the die parts 22 and 24 be secured together with the formations 30 and 32 in exact registry and that they be held in this position throughout normal roll life.

To this end the die part 22 is provided with four plugs 46 press-fitted into four equally spaced openings 48. The die part 24 is provided with a similar set of four plugs 50 press-fitted into corresponding openings 52, only one such plug and opening being shown. When initially installed the plugs 46 and 50 are solid.

After all other machining and heat treating operations have been performed, the die parts 22 and 24 are clamped together with the peripheral ridge and groove formations 30 and 32 in exact registry. This will usually require that the plugs 46 be slightly out of registry with the plugs 50 and similar slight displacement of the keyway 44 from the keyway 42 and it is for this reason that the keyway 44 is made oversize. After the parts have been so assembled and firmly clamped, openings are drilled through the plugs 46 and 50 and pins 54 are press-fitted into these openings. The resulting die assembly 20 then possesses essentially the same rigidity as a one-piece die.

In use, a pair of the die assemblies 20 is installed in a machine of the type disclosed in the aforementioned copending application Ser. No. 618,750 and workpieces having plane, cylindrical surfaces are fed to the machine. The machine is adjusted so as to produce sufficient lateral displacement of the movable die to form the workpieces to final dimensions.

Actual experience has shown that workpieces so formed can be held to very close dimensional tolerances, the individual gear teeth are formed with a high quality finish and because of the action of the rolls in displacing the metal to form the gear teeth on the workpiece, the finished products are characterized by unusual strength and wear resistance. It has also been determined that production rates can be maintained which are compatible with the requirements of the automotive industry and the costs of the individual parts are a small fraction of those associated with a formation of herringbone gears with the most efficient previously known method and apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to be secured by Letters Patent is:

1. A die assembly for rolling herringbone gear teeth on the surface of a workpiece comprising a pair of die parts, each part having peripheral ridge and groove formations complimentary to the teeth to be formed on the workpiece, the formations on said parts being of opposite hand, the formations extending to at least one side face of each part, a plurality of plug inserts carried by each die part, the inserts of one die part being roughly aligned with the inserts of the other die part in assembly, and pins extending through openings in said plugs, said openings in the plugs of one die part being exactly aligned with the openings in the plugs of the other die part when said formations are in registry whereby said pins secure said die parts together with said side faces in contact with the formations in registry.

2. A method of fabricating a die for roll forming herringbone gears on the periphery of a workpiece comprising the steps of providing a pair of finished heat treated die parts having helical ridge and groove formations complementary to the teeth to be formed on said workpiece, the formations of said die parts being of opposite hand, and extending to at least one side face of each die part, said die parts also having a plurality of through openings, inserting drillable plugs in said openings, positioning said die parts to dispose said side faces in contact and said peripheral formations in registry and to dispose the plugs of one die part in substantial generally alignment with the plugs in the other die part, forming a bore through each plug in one die part extending into the corresponding plug in the other die part while said die parts are held in said position, and fitting pins in each of said bores to secure said die parts together.